United States Patent
Dong et al.

(10) Patent No.: US 7,518,488 B2
(45) Date of Patent: Apr. 14, 2009

(54) MOTOR VEHICLE IDENTIFY ANTI-FAKE APPARATUS AND METHOD

(75) Inventors: Wenming Dong, Rm. 2-14, Bldg. 4, No. 193, Jianshebel Road, Taiyuan (CN) 030013; Guangming Dong, Taiyuan (CN)

(73) Assignee: Wenming Dong, Taiyan (CN)

( * ) Notice: Subject to any disclaimer, the term of this patent is extended or adjusted under 35 U.S.C. 154(b) by 462 days.

(21) Appl. No.: 10/535,756
(22) PCT Filed: Nov. 21, 2003
(86) PCT No.: PCT/CN03/00987

§ 371 (c)(1),
(2), (4) Date: Feb. 23, 2006

(87) PCT Pub. No.: WO2004/049184

PCT Pub. Date: Jun. 10, 2004

(65) Prior Publication Data

US 2006/0158321 A1 Jul. 20, 2006

(30) Foreign Application Priority Data

Nov. 23, 2002 (CN) .............................. 02 1 52547

(51) Int. Cl.
- *B60Q 1/00* (2006.01)
- *B60R 25/10* (2006.01)
- *G08B 1/08* (2006.01)
- *G08B 13/14* (2006.01)
- *G08G 1/01* (2006.01)
- *G08G 1/017* (2006.01)
- *G06F 17/00* (2006.01)
- *G06F 19/00* (2006.01)
- *G06F 7/00* (2006.01)
- *G06K 19/06* (2006.01)
- *G05D 1/00* (2006.01)

(52) U.S. Cl. ............ 340/426.1; 340/425.5; 340/426.22; 340/539.13; 340/572.1; 340/572.7; 340/903; 340/933; 340/937; 340/5.61; 340/5.86; 235/375; 235/385; 235/492; 701/1; 701/29; 701/32

(58) Field of Classification Search .............. 340/425.5, 340/426.1, 426.22, 539.13, 572.1, 933, 937, 340/5.61, 5.86; 235/375, 385, 492; 701/1, 701/29, 32

See application file for complete search history.

(56) References Cited

U.S. PATENT DOCUMENTS 6,081,206 A * 6/2000 Kielland .................... 340/937

(Continued)

FOREIGN PATENT DOCUMENTS

CN    1367465 A    9/2002

(Continued)

OTHER PUBLICATIONS

Japanese Office Action issued for Japanese Patent Application No. 2004-554165, Sep. 25, 2007 (2 pages).
Japanese Rejection Decision issued for Japanese Patent Application No. 2004-554165, Jan. 29, 2008 (2 pages).

*Primary Examiner*—Benjamin C Lee
*Assistant Examiner*—Lam P Pham
(74) *Attorney, Agent, or Firm*—Wilmer Cutler Pickering Hale and Dorr LLP

(57) ABSTRACT

The present invention discloses a motor vehicle identity anti-fake apparatus and method. The motor vehicle identity includes a microcomputer (1), communicators (2), member anti-fake apparatus (3) and information displays (4). The motor vehicle identity anti-fake apparatus is installed on vehicle license and members of the vehicle. The apparatus monitors, analyzes and judges the vehicle and the license plate and certificates thereof automatically under the control of the preloaded software or the wireless management of the administrative institution, and provide information of the self-detection to outside. The present invention is used for anti-fake of motor-vehicle-identity-status and provides to the enforcement organ for recognizing the legal status of motor-vehicle-identity.

13 Claims, 4 Drawing Sheets

U.S. PATENT DOCUMENTS

| | | | |
|---|---|---|---|
| 6,359,570 B1* | 3/2002 | Adcox et al. | 340/902 |
| 6,366,222 B1* | 4/2002 | Russell, Jr. | 340/933 |
| 6,433,706 B1* | 8/2002 | Anderson et al. | 340/937 |
| 6,448,889 B1* | 9/2002 | Hudson | 340/425.5 |
| 6,781,523 B2* | 8/2004 | Matsui et al. | 340/910 |
| 7,183,945 B2* | 2/2007 | DiDomenico et al. | 340/937 |
| 2002/0080013 A1* | 6/2002 | Anderson et al. | 340/425.5 |
| 2004/0004539 A1* | 1/2004 | Collins | 340/426.1 |

FOREIGN PATENT DOCUMENTS

| | | |
|---|---|---|
| EP | 0 649 124 A1 | 9/1994 |
| JP | 2001034885 | 2/2001 |
| JP | 2002002410 | 1/2002 |
| JP | 2002208088 | 7/2002 |

\* cited by examiner

MOTOR VEHICLE IDENTIFY ANTI-FAKE APPARATUS AND METHOD

TECHNICAL FIELD OF THE INVENTION

The present invention relates to an apparatus and method for monitoring and reflecting the legality of a motor vehicle identity status to outside by using a vehicle-mount microcomputer information system, and belongs to the field of identity anti-fake and automatic identification for a motor vehicle.

DESCRIPTION OF THE RELATED ART

The legality of a motor vehicle identity is a broad conception and generally comprises the following aspects: whether the license plate itself is true or false and whether it is in conformity with the vehicle; whether the main configuration, appearance and color of the vehicle are in conformity with those of in legal enrollment and registration; whether the vehicle has passed the verification and check with respect to stipulated items on schedule; whether the source and usage of the vehicle are legal, and the like.

The identification of legality of a road vehicle identity is a difficulty not solved for a long time both domestically and abroad. If the difficulty can not be resolved properly, illegal vehicles, for example including the situations of false license plate, inconformity between the license plate and the vehicle, illegal repack, illegal operation, counterfeiting of a specific identity, evasion of stipulated fees, theft of vehicles, verification and check period overrun, etc., cannot be forbidden, and vehicle-related crimes can not be prevented effectively.

The current methods for detecting the identity legality of a road vehicle may be classified into the following two categories.

1. Direct detection. In this type of method, a vehicle is stopped and the license plate, the vehicle and related certificates are synthetically detected. This is a standard method with accuracy and thoroughness, but it is mainly manually operated, is time consuming and toilsome and thus has low efficiency. This method is particularly prone to being restricted by various subjective and objective factors and thus generally cannot be efficiently implemented. Therefore, this kind of method cannot be the mainstream method, except for being at special places or in special conditions.

2. Indirect detection. In this type of method, the legality of the driving vehicle is indirectly judged by monitoring the license plate (or logo, the same below). Since this kind of method is suitable for automatic identification, more and more countries and regions regard the method as a mainstream technology for monitoring the vehicle. However, since the this kind of method only monitors the license plate but not detect the vehicle and related certificates, and current license plate technology does not have the function of reflecting the virtual status of the vehicle identity, judging the defects of the vehicle depending on such kind of method can only obtain uncertain conclusions, particularly cannot confirm that the identity of the vehicle is legal. Moreover, this kind of method has high demands for ground detection system, and thus, in the regions being incompletely provided ground detection apparatus, this type of method will not obtain any effect, and the defection cannot be implemented without omission. For example, a radio frequency communication system is disclosed in Chinese Patent Application No. CN1305911A, published on Aug. 1, 2001 and entitled "automobile electronic license plate system", and the system comprises automobile electronic license plate apparatus and automobile electronic license plate detection apparatus. According to the descriptions of the specification of the application, said system has the function of quickly identifying and finding remarkable features of the vehicle, as well as the function of automobile logo anti-fake. However, as can be seen from the technical solution, this system also has the similar difficulty as mentioned above, and can not make sure to accurately identify and find the vehicle. This system especially can not confirm that the identify of the vehicles is legal, and does not have the anti-fake function with respect to the vehicle and the logo. Said system cannot obtain any effect in regions having no ground detection apparatus.

At present, the illegal vehicle on road cannot be detected or prevented and a variety of detecting methods cannot resolve the problem of vehicle identification, the reasons lie in that the vehicle has not anti-fake design and the appearance and license plate of the vehicle do not have the function of reflecting the virtual status of the vehicle identity.

SUMMARY OF THE INVENTION

In order to resolve the difficulty of judging the identity legality of a road vehicle, it is needed to design a new technical solution to eliminate the source of the difficulty. The present invention exactly solves the above difficulty. According to the present invention, a device is mounted on the vehicle for automatically monitoring, analyzing and judging the vehicle itself, the license plate and related certificates and providing to outside the resulting information of the above said self detection, wherein the administrative institution input in advance the electronic archives of the vehicle identity into a microcomputer of said device. The present invention thus achieves the anti-fake of the vehicle identity, and makes the appearance and license plate of the vehicle have the function of reflecting the virtual status of the vehicle identity and makes the illegal vehicles be exposed automatically.

The technical solution of the present invention is described as follows.

1. The anti-fake apparatus for motor vehicle identity comprises four parts: member anti-fake means, a microcomputer, information displays and communicators. The power supply for the system operation directly comes from the vehicle power supply.

The microcomputer comprises a microprocessor, a memory and a group of communication interfaces, which microcomputer is mounted on the vehicle or the license plate.

Each of the member anti-fake means is a means containing identification information. The license plate and respective members of the vehicle legally enrolled and registered according to stipulations of the administrative institution are respectively provided with at least a member anti-fake means. Respective member anti-fake means is in signal connection with respective communication interface of the microcomputer, respectively. Two types of member anti-fake means can be used. One type is the member anti-fake means that is in wired signal connection with the microcomputer, and the other type is the member anti-fake means that is in wireless connection with the microcomputer. The microcomputer monitors the status of the identify information of respective member anti-fake means, so as to make judgment on the status of the identity of the license plate or members of the vehicle on which the respective member anti-fake means mounted.

The informal displays are mounted on the license plate or members of the vehicle, and connected to the communication interfaces of the microcomputer by wires. The information displays can employ colorful light information display, acoustic information display or screen display. The function of these information displays is to convert the signal transmitted from the microcomputer and reflecting the legality of the status of the vehicle identity to information expressing modes, for example the colorful light, the acoustic information or graphics and text that can be identified directly by sense of human being.

The communicators are wireless bidirectional communication apparatus and mounted on the vehicle or the license plate, and the number of the communicators is at least one.

The communication interface of the communicator is connected to the communication interface of the microcomputer by wires. The communicator is used for intercommunion between the motor vehicle identity anti-fake apparatus and the outside administrative institution.

A vehicle-mount information system for monitoring and reflecting the legality of the status of the vehicle identity is formed by means of the signal connections among the microcomputer, the respective member anti-fake means, the information displays and the communicator.

2. Each of the member anti-fake means being in wired signal connection with the microcomputer is a IC chip means, comprising a data input/output interface and a memory for storing identification information, wherein the data input/output interface is connected to the communication interfaces of the microcomputer by wires.

3. Each of the member anti-fake means being in wireless signal connection with the microcomputer is a noncontact IC card chip, and is in signal connection with said microcomputer through a noncontact IC card read/write unit, wherein said noncontact IC card read/write unit is mounted on the vehicle or the license plate and is in signal connection with said concontact IC card chip in a radio frequency communication manner. The communication interface of said noncontact IC card read/write unit is connected to said communication interface of said microcomputer by wires.

4. The member anti-fake means are fixed on the license plate or respective members of the vehicle in a sticking or covering seal manner.

5. The colorful light information displays are electrical light-emitting means, and there are at least three colorful light information displays with at least two different colors. The input ports of respective colorful light displays are connected to the communication interfaces of the microcomputer by wires, respectively.

6. The electrical light-emitting means are light-emitting diodes.

7. The acoustic information display is an electrical sounding means, and there is at least one acoustic information display. The input port of the acoustic information display is connected to the communication interface of the microcomputer by wires.

8. The screen information display is an electronic screen information display means having a communication interface. There is at least one screen information display. The screen information display is mounted in the cab of the vehicle, and the communication interface of the screen display is connected to the communication interface of the microcomputer via wires.

9. The colorful light information displays and acoustic information display are connected to the microcomputers, respectively, via an acoustooptic controller, and each of the acoustooptic controller is a microcomputer system having an acoustooptic drive module, and comprises CPU, ROM, RAM, I/O, a communication interface, an acoustooptic drive module and an output port.

The communication interface of each of the acoustooptic controller is connected to the communication interface of the microcomputer via wires. The output port of respective acoustooptic controller is directly connected to the input port of respective colorful light information displays or the acoustic information display, and the connection ports and the acoustooptic controller are packaged into an integral closed body by insulating material.

10. The member anti-fake means, colorful information displays, acoustic information display, microcomputer and communicator are mounted and packaged into the body of the license plate; the body of the license plate serves as the base and casing of these components. The body of the license plate is made from insulating material, and the front face of the license plate body is provided with windows through which the colorful light information displays radiate color light signal to outside.

11. The microcomputer, information displays and communicator are packaged into a cartridge which is mounted inside the cab of the vehicle.

12. The motor vehicle identity anti-fake apparatus automatically detects the status of the vehicle identity, displays or communicates in wireless manner the detection results according to pre-configurations of the administrative institution or to the real-time wireless remote control instructions issued by the administrative institution.

The administrative institution loads in advance in the microcomputer operation management software, and writes into the microcomputer the archive information of the vehicle and identify identification information of respective member anti-fake means and the position on which the respective member anti-fake means are located. After completing the above said configurations, the motor vehicle identity anti-fake apparatus starts to operate automatically under the control of the microcomputer.

According to the predetermined program, the microcomputer makes detection and judgment automatically with respect to the following five aspects based on the detection demand, time information, current image feature information of the vehicle, the identity feature information of the illegal vehicles which are required to be particularly looked up, issued by the administrative institution in wireless manner and received by the communicator.

(1) Judging the legality of the license plate or members of the vehicle.

The microcomputer extracts information from respective member anti-fake means and compares the extracted information with the feature information of the respective member anti-fake means previously stored in the microcomputer. If all the features are consistent with each other, it indicates that the identity of the license plate and members are legal; if the feature information of one or more of the member anti-fake means is inconsistent or does not exist, it means that the identity of the vehicle is illegal.

(2) Judging whether the motor vehicle has passed the verification and check with respect to stipulated items on schedule.

The microcomputer retrieves contents of the items which have passed the verification and check and the period of validity from vehicle archive information stored in advance in the memory of the microcomputer, and makes judgment to determine whether or not said items are still within said period of validity. If all the items fall within the period of validity, it means that the vehicle has passed the verification and check with respect to the stipulated items on schedule; otherwise, it means that the identity of the vehicle is illegal.

(3) Judging whether the motor vehicle has special usages or not:

The microcomputer retrieves and judges information on usage of the vehicle and period of validity of the usage from the vehicle archive information stored in advance in the memory of the microcomputer. If there exists some special usages which should be registered in the administrative institution and such special usages fall within the period of validity, it means that the vehicle has such special usages; otherwise, it means that the vehicle has no such special usages.

(4) Judging to determine whether the vehicle belongs to an illegal vehicle particularly tracked by related enforcement organ.

The communicator receives the identity feature information issued in wireless manner by the administrative institution about the illegal vehicle that needs to be particularly tracked, and stores immediately such information into the microcomputer. The microcomputer compares the received feature with the feature of the present vehicle as stored in advance. If the features are consistent with each other, it means that the present vehicle belongs to the illegal vehicle particularly tracked by the related enforcement organ.

(5) Judging whether the appearance and color are in conformity with those of in the enrollment and registration.

The communicator receives the feature information about the real-time image of the present vehicle transmitted by the external detection station, and stores immediately the received feature information into the microcomputer. The microcomputer compares the received information with the image feature of the present vehicle in the vehicle archive information stored in advance. If the comparison result is consistent, it means that the vehicle is legal in terms of the appearance and the color; otherwise, it means that the vehicle identity is illegal.

The microcomputer stores at any moment the detection and judgment conclusions in terms of the above five aspects into the memory, and at the same time controls the display modes and contents of the information displays according to the property of the detection and judgment conclusions, as well as controls the transmission timing and contents of the communicators according to the instructions as issued by the administrative institution in a wireless communication manner.

13. The method performed by the microcomputer to control the transmission timing and contents of the communicators according to the instructions as issued by the administrative institution in a wireless communication manner is described as follows. The receiver of the communicator is always in operation status under the management of the microcomputer. Upon the microcomputer finds that the communicators receive the calling information of the management center or the detection station, the microcomputer stores the set of information into the memory, and makes judgment from this set of information to determine whether there exists a detection demand of the administrative institution for checking and detecting the present vehicle. If there exists such a detection demand, the microcomputer furthers determines the authority of the detecting party. If the detection demand is legal, according to a predetermined program, the microprocessor of the microcomputer selects information within the authority of the detecting party from the information stored in the memory, and organizes and generates reply information and controls the transmitter of the communicator to transmit the reply information.

The present invention substantively supplements and improves the function of the license plate, or provides an intellectual "ID card" of a vehicle, or is an "electronic police" accompanying the vehicle. The present invention not only enables the license plate itself to possess the function of anti-fake, but also ensures the reliable correspondence between the license plate and the vehicle, and thus making the license plate or the appearance of the vehicle has the function of reflecting the legality status of the vehicle identity.

Since the present invention radically resolves the problem of anti-fake identification of the basic information of the vehicle and possesses various information representation modes, it plays an important role in traffic management, vehicle management of state road and other fields related with the identification of vehicle identity. More specifically, the present invention at least has the following three remarkable effects.

(1) The present invention provides a precondition for resolving the difficulty of identification of the vehicles on road. Since the present invention outputs to outside the detection conclusion information directly, it can make the current license plate technology be updated and developed to the vehicle identification technology. The administrative institution can detect or observe the vehicle by using simpler detection apparatus, and even just by eyeballing, without stopping the vehicle, thus obtaining good effects similar to that of in the method of "stopping the vehicle for detection". Moreover, as compared with existing various automatic license plate identification technology, the demand for the external detection system is simple, and the management cost is largely reduced. In particular, the visual identification by naked eye is simply implemented, and these exists no detection omission nationwide.

(2) The present invention changes the passive situation in which the administrative institution can not master the basic information of the driving vehicles, and thus provides a precondition to achieve intelligentization, informatization and real-time of the road vehicle and traffic managements.

(3) The present invention achieves the policy of "give first rank to prevention". Since the illegal vehicles are always in the status of exposure, people who drive the illegal vehicles are heavily deterred, so that the illegal vehicles are prevented from occurring and being driven on road, thereby vehicle-related crimes will be reduced markedly.

DESCRIPTION OF THE PREFERRED EMBODIMENT

The present invention is further described in details as follows in association with figures and embodiments.

Figure 1:
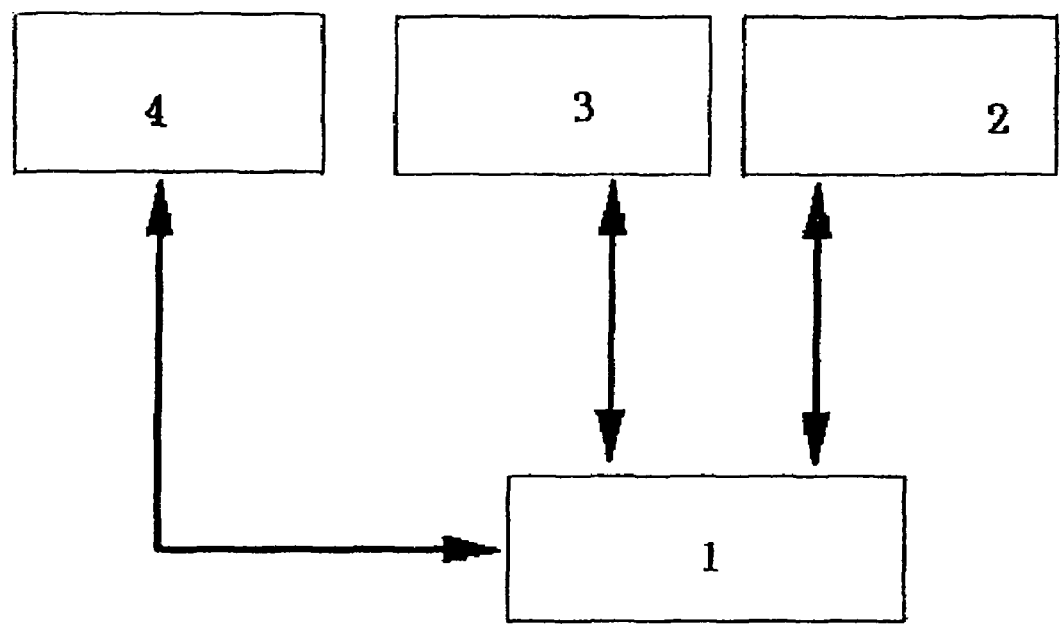
FIG. 1 is a principle chart of the configuration of the motor vehicle identity anti-fake apparatus according to the present invention.

FIG. 1 is a principle chart of the configuration of the motor vehicle identity anti-fake apparatus according to the present invention. The anti-fake apparatus for motor vehicle identity comprises four parts: member anti-fake means 3, a microcomputer 1, information displays 4 and communicators 2. The power supply for the system operation directly comes from the vehicle power supply.

Functions of Respective Components (1) The member anti-fake means 3 is integrated with the license plate or the members, serving as the feature signs for identifying the license plate or the members.

(2) The communicators 2 communicate with the external management center and the detection station by wireless manner. At least a set of communicator is indispensable, preferably two sets, wherein one set performs short distance radio communication with the roadside detection station, and the other set performs long distance wireless communication directly with the management center within a range of certain region.

(3) The information displays 4 are used to intuitively display the information reflecting the current status of the vehicle identity. There are three types of information displays that can be selected. The colorful light information displays 41 represent specific information associated with the legal status of the vehicle identity using different position relation, color or flicker of light. The acoustic information display 42 represents that the identity of the vehicle currently exists an illegal status using sound signal. The screen display 43 represents information on the legality of the vehicle identity using graphics and text.

(4) The microcomputer 1 is a center for storing and processing information, and controlling operation of the motor vehicle identity anti-fake apparatus.

Figure 2:
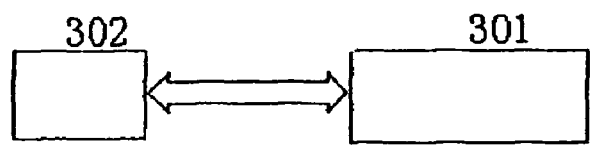
FIG. 2 is a principle chart of each of the member anti-fake means 3-1 and 3-2 which is in wired signal connection with the microcomputer according to an embodiment as shown in FIG. 4.
Figure 4:
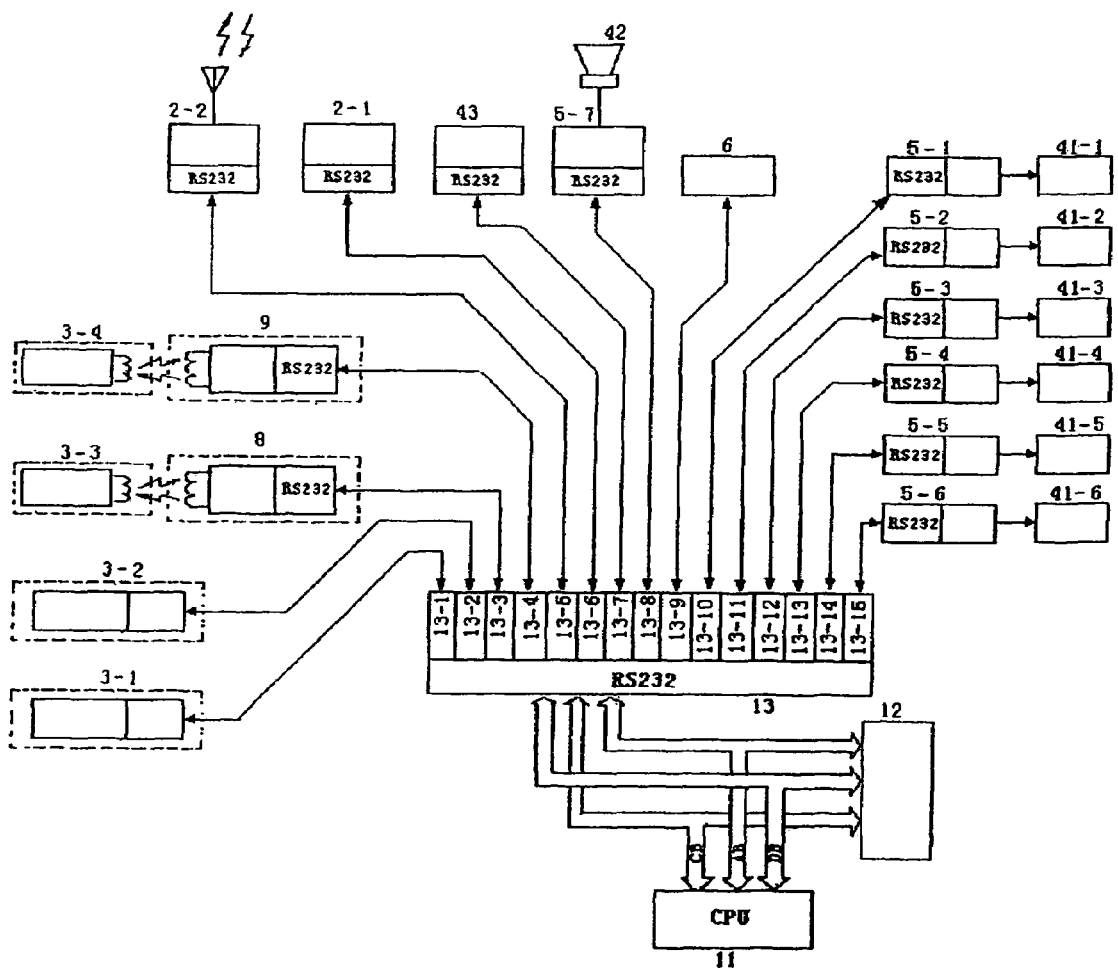
FIG. 4 is a principle chart of the motor vehicle identity anti-fake apparatus according to an embodiment.

FIG. 2 is a principle chart of each of the member anti-fake means 3-1 and 3-2 which is in wired signal connection with the microcomputer according to the embodiment as shown in FIG. 4.

Each of the member anti-fake means 3-1 and 3-2 comprises a data input/output interface 302, a memory 301 containing identity identification information.

Figure 3:
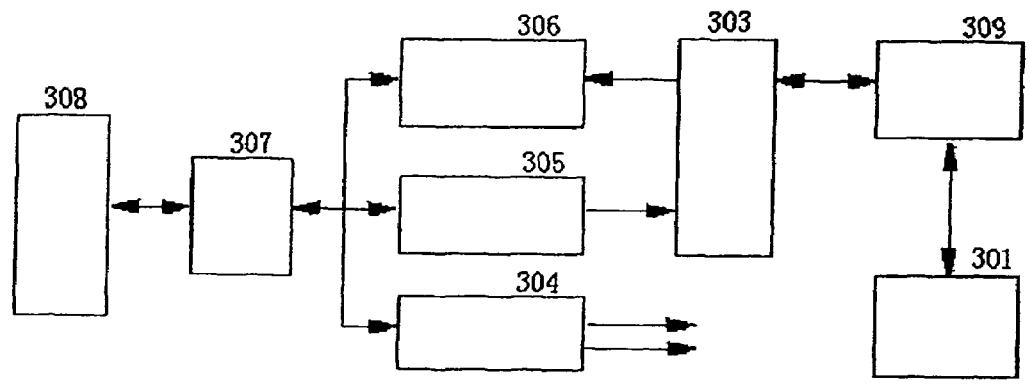
FIG. 3 is a principle chart of each of the member anti-fake means 3-3 and 3-4 which is in wireless signal connection with the microcomputer according to the embodiment as shown in FIG. 4.

FIG. 3 is a principle chart of each of the member anti-fake means 3-3 and 3-4 which is in wireless signal connection with the microcomputer according to the embodiment as shown in FIG. 4.

Each of the member anti-fake means 3-3 and 3-4 adopts a noncontact IC card chip, comprising a memory 310, an encryption and decryption module 303, a rectifying and voltage-modulating module 304, a data encoding and transmitting module 305, a signal and clock extracting module 306, a high-frequency signal receiving and transmitting module 307, an antenna 308, a microprocessor and monitoring program 309.

FIG. 4 is a principle chart of an embodiment of the motor vehicle identity anti-fake apparatus.

The anti-fake means 3 comprises four member anti-fake means 3-1, 3-2, 3-3, 3-4, which four member anti-fake means are respectively stuck and sealed with epoxy resin onto the front license plate, the car frame, the engine and the back surface of the rear license plate. The data input/output interface of the member anti-fake means 3-1 is connected to the communication interface 13-1 of microcomputer 1 via wires, the data input/output interface of the member anti-fake means 3-2 is connected to the communication interface 13-2 of microcomputer 1 via wires.

Noncontact IC card read/write unit 8 and read/write unit 9 are respectively stuck and sealed with epoxy resin on a position within 10 cm in the vicinity of the member anti-fake means 3-3 and 3-4. The communication interface of read/write unit 8 is connected to the communication interface 13-3 of microcomputer 1 via wires, and the communication interface of read/write unit 9 is connected to the communication interface 13-4 of microcomputer 1 via wires.

Microcomputer 1 comprises a microprocessor 11, a memory 12, communication interfaces 13, and is mounted within the body 7 of the front license plate. The microprocessor 11 operates at a clock frequency of 1 GHz. The memory 12 comprises a memory for storing programs and data, and a random access memory. The interfaces 13 has 15 independent communication interfaces indicated respectively as communication interfaces 13-1, 13-2, 13-3, 13-4, 13-5, 13-6, 13-7, 13-8, 13-9, 13-10, 13-11, 13-12, 13-13, 13-14 and 13-15, and all these communication interfaces employ serial communication interface RS232.

A peripheral communication socket 6 is connected to the communication interface 13-9 of microcomputer 1 and mounted on the side face of the front license plate body 7, and is used to supply wired connection communication between the computer of the management center and microcomputer 1 whenever necessary.

The communicators 2 comprise communicators 2-1 and 2-2. The communicator 2-1 is a radio frequency communicator, and it adopts an "electronic label" radio frequency communication circuit. The controller of the communicator 2-1 is provided with a RS232 communication interface which is connected to the communication interface 13-6 of microcomputer 1. The communication between said communicator 2-1 and the detection station on the roadside is controlled by the microcomputer 1. The communicator 2-1 is fixed and sealed in the front license plate body 7. The communicator 2-2 adopts a miniature ultrashort wave transceiver having a communication interface. The communication interface of the communicator 2-2 is connected to the communication interface 13-5 of microcomputer 1, and the communication between said communicator 2-2 and the management center is controlled by the microcomputer 1.

The colorful light information displays 41 comprise six colorful light information displays indicated respectively as 41-1, 41-2, 41-3, 41-4, 41-5 and 41-6, which six colorful light information displays employ light-emitting diodes. The single acoustic information display 42 employs an electronic speaker.

The acoustooptic controllers 5 comprise seven controllers indicated respectively as 5-1, 5-2, 5-3, 5-4, 5-5, 5-6 and 5-7. The output ports of the seven controllers are respectively connected to the input ports of the colorful light information displays 41-1, 41-2, 41-3, 41-4, 41-5, 41-6 and acoustic information display 42, and the respective connection ports and the acoustooptic controller chips are stuck and sealed by epoxy resin as a whole body which is then mounted into the front license plate body 7. The communication interfaces of acoustooptic controllers 5-1, 5-2, 5-3, 5-4, 5-5, 5-6 and 5-7 are respectively connected to the communication interfaces 13-10, 13-11, 13-12, 13-13, 13-14, 13-15 and 13-8 of microcomputer 1.

The screen display 43 adopts a crystal liquid display, and its communication interface is connected to the communication interface 13-7 of microcomputer 1.

The screen display 43 and the communicator 2-2 are packaged into a cartridge which is mounted on the operating board in front of the driver inside the vehicle.

Figure 5:
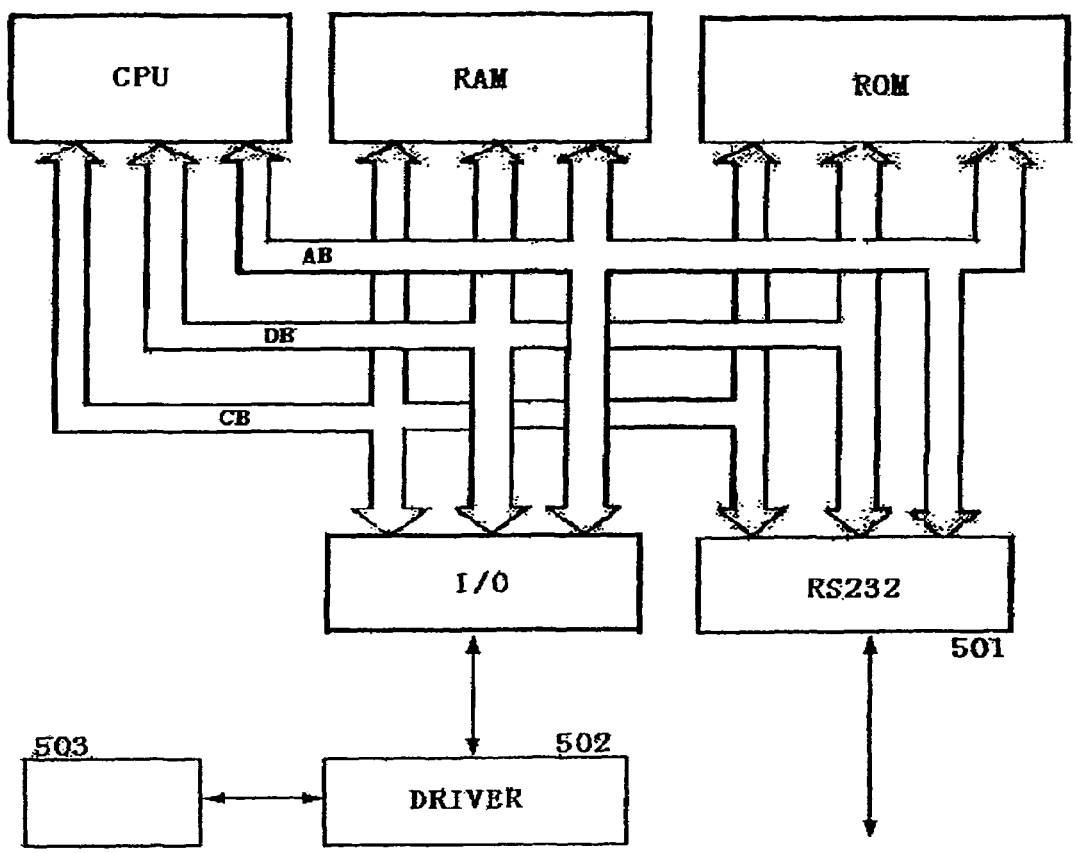
FIG. 5 is a principle chart of each of the acoustooptic controller 5 according to the embodiment as shown in FIG. 4.

FIG. 5 is a principle chart of each of the acoustooptic controller 5 according to the embodiment as shown in FIG. 4. Each of the acoustooptic controller 5 is a microcomputer system having an acoustooptic drive module, and comprises MPU, ROM, RAM, I/O, a communication interface 501, an acoustooptic drive module 502 and an output port 503.

The acoustooptic controllers provide drive power for the information displays, and more importantly, they prevent the pseudo control signal from entering the information displays by means of the close connection and seal between the acoustooptic controllers and the input ports of the information displays.

Figure 6:
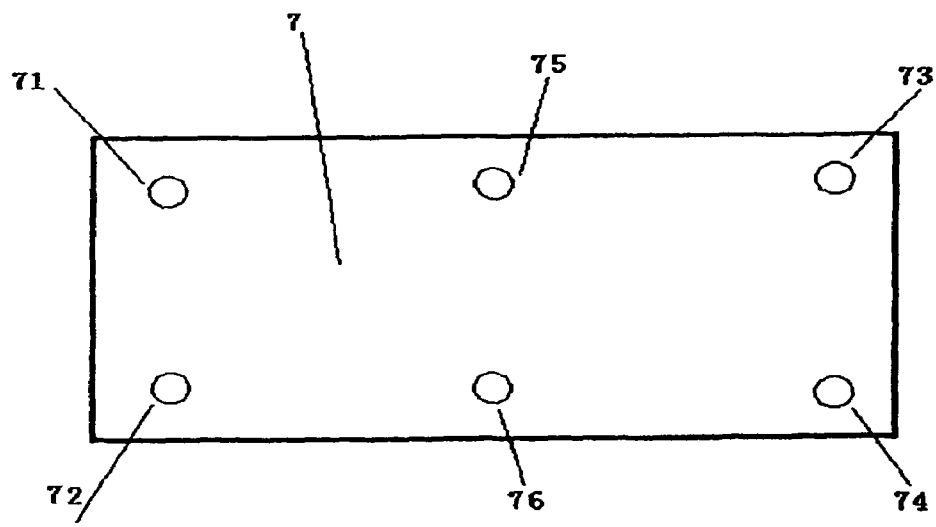
FIG. 6 shows six window positions of the front license plate body 7 according to the embodiment as shown in FIG. 4.

FIG. 6 shows six window positions of the front license plate body 7 according to the embodiment as shown in FIG. 4.

The front license plate body 7 is provided with six windows on the surface, indicated respectively as windows 71, 72, 73, 74, 75, 76, and colorful light information displays 41-1, 41-2, 41-3, 41-4, 41-5 and 41-6 are respectively mounted inside these windows for radiating colorful light to outside. The colorful light information displays 41-1, 41-2, 41-3, 41-4, 41-5 are light-emitting diodes which emit green light. When the colorful light information display 41-1 emits light, it means that the license plate, the car frame and the engine are legal; when the colorful light information display 41-1 does not emit light, it means that the license plate or the car frame or the engine are illegal. When the colorful light information display 41-2 emits light, it means that the vehicle has passed the verification or check with respect to all stipulated items on schedule; when the colorful light information display 41-2 does not emit light, it means that the vehicle has failed to pass the verification or check with respect to some of the stipulated items. When the colorful light information display 41-3 emits light, it means that the appearance and the color of the vehicle are in conformity with those on in the enrollment and registration; when the colorful light information display 41-3 does not emit light, it means that the appearance and the color of the vehicle are not in conformity with those of in the enrollment and registration. When the colorful light information display 41-4 emits light, it means that the present vehicle does not belong to the vehicle particularly tracked by related enforcement organ; when the colorful light information display 41-4 does emit light, it means that the present vehicle belongs to the vehicle particularly tracked by related enforcement organ. The vehicle particularly tracked are the vehicles that are looked for or controlled by the related enforcement organ for some reasons, for example, the particularly tracked vehicles include the robbed cars and stolen cars. When the colorful light information display 41-5 emits light, it means that the vehicle has some special usages; when the colorful light information display 41-5 does not emit light, it means that the vehicle does not have some special usages. The special usage is defined by the administrative institution, for example including the police car, the taxi, or the like. The colorful light information display 41-6 is a light-emitting diode which emits red light. When the colorful light information display 41-6 emits light, it means one of the identity of the vehicle is illegal; when the colorful light information display 41-6 does not emit light, it means nothing.

Figure 7:
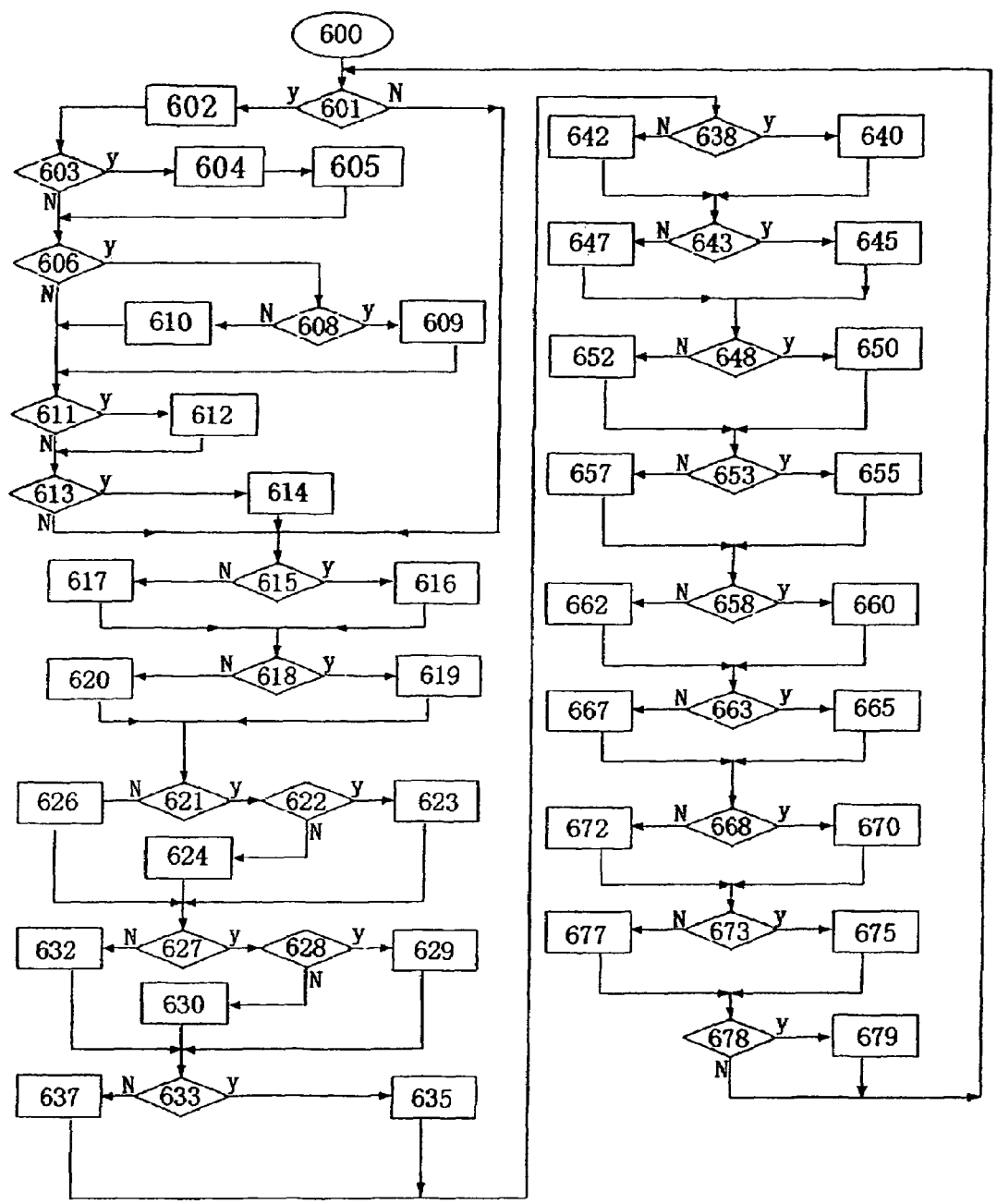
FIG. 7 is a main flow chart of the operation program of the microcomputer 1 according to the embodiment as shown in FIG. 4.

FIG. 7 is a main flow chart of the operation program of the microcomputer 1 according to the embodiment as shown in FIG. 4.

The operation of each step is described sequentially in details as follows:

1. the vehicle being powered on, and the motor vehicle identity anti-fake apparatus and the microcomputer 1 immediately starting to work (600);
2. making check to determine whether or not the communicators 2-1 and 2-2 receive legal calling information (601);
3. if a legal call is received, writing this set of information having the legal call into the memory 12 (602);
4. making check to determine whether or not the information written into the memory 12 has a detection command or questioning query information of the management center or the detection station (603);
5. if there exists a detection command or questioning query information, determining the authority of the management center or the detection station (604);
6. organizing reply information according to the authority of the management center or the detection station, and controlling the communicator 2-1 or 2-2 to transmit the reply information and writing the operation records into the memory 12 (605);
7. making check to determine whether or not the information newly written into the memory 12 has the vehicle image feature information transmitted from the detection station (606);
8. if there exists the vehicle image feature information, comparing said vehicle image feature information with the present vehicle image feature in the vehicle archive information stored in the memory, and writing the comparison result into the memory 12 (608);
9. if said comparison result is consistent, transmitting an instruction of switching on the colorful light information display 41-3 to the acoustooptic controller 5-3, controlling the screen display 43 to describe in graphics and text that the appearance and the color of the vehicle are consistent with those of in the enrollment and registration, and writing the operation records into the memory 12 (609);
10. if said comparison result is inconsistent, transmitting an instruction of switching off the colorful light information display 41-3 to the acoustooptic controller 5-3; transmitting an instruction of switching on the colorful light information display 41-6 to the acoustooptic controller 5-6; transmitting an instruction of switching on the acoustic information display 42 to the acoustooptic controller 5-7; controlling the screen display 43 to describe in graphics and text that the appearance and the color of the vehicle being inconsistent with those of in the enrollment and registration, and writing the operation records into the memory 12 (610);
11. making check to determine whether or not the information newly written into the memory 12 has standard time information (611);
12. if there exists standard time information, setting said standard time as the present time of the inner clock of the microcomputer 1 itself (612);
13. making check to determine whether or not the information newly written into the memory 12 has the name of the present vehicle particularly tracked by the management center (613);
14. if there exists the name of the present vehicle particularly tracked by the management center, transmitting an instruction of switching on the colorful light information display 41-6 to the acoustooptic controller 5-6; transmitting an instruction of switching off the colorful light information display 41-4 to the acoustooptic controller 5-4; transmitting an instruction of switching on the acoustic information display 42 to the acoustooptic controller 5-7; controlling the screen display 43 to describe in graphics and text that the vehicle belongs to vehicle particularly tracked by the related enforcement organ; writing the operation records into the memory 12 (614);

15. judging to determine whether or not the vehicle has passed the verification and check with respect to stipulated items on schedule, and writing the judging result into the memory 12 (615);
16. if the vehicle has passed the verification and check with respect to stipulated items on schedule, transmitting an instruction of switching on the colorful light information display 41-2 to the acoustooptic controller 5-2; controlling the screen display 43 to describe in graphics and text that the vehicle has passed the verification and check with respect to stipulated items on schedule (616);
17. if the vehicle has not passed the verification and check with respect to stipulated items on schedule, transmitting an instruction of switching off the colorful light information display 41-2 to the acoustooptic controller 5-2; transmitting an instruction of switching on the acoustic information display 41-6 to the acoustooptic controller 5-6; transmitting an instruction of switching on the acoustic information display 42 to the acoustooptic controller 5-7; controlling the screen display 43 to describe in graphics and text that the vehicle has not passed the verification and check with respect to stipulated items on schedule (617);
18. judging to determine whether or not the vehicle has some special usages, and writing the judging result into the memory 12 (618);
19. if the vehicle has some special usages, transmitting an instruction of switching on the colorful light information display 41-5 to the acoustooptic controller 5-5; controlling the screen display 43 to describe in graphics and text the special usages that the vehicle has (619);
20. if the vehicle has no special usage, transmitting an instruction of switching off the colorful light information display 41-5 to the acoustooptic controller 5-5;
21. checking the read/write unit 8-621;
22. if there exists identification information of the read/write unit 8, checking the member anti-fake means 3-3 (622);
23. if there exists identification information of the member anti-fake means 3-3, controlling the screen display 43 to describe in graphics and text that the identity of the vehicle engine is legal; transmitting an instruction of switching on the colorful light information display 41-1 to the acoustooptic controller 5-1 if the operation records contain the identification information of the other three member anti-fake means 3-1, 3-2 and 3-4 at the same time; writing the monitoring operation records into the memory 12 (623);
24. if there does not exist identification information of the member anti-fake means 3-3, transmitting an instruction of switching off the colorful light information display 41-1 to the acoustooptic controller 5-1; transmitting an instruction of switching on the colorful light information display 41-6 to the acoustooptic controller 5-6; transmitting an instruction of switching on the acoustic information display 42 to the acoustooptic controller 5-7; controlling the screen display 43 to describe in graphics and text that the identity of the vehicle engine is illegal, and writing the monitoring operation records into the memory 12 (624);
25. if there does not exist identification information of the read/write unit 8, transmitting an instruction of switching off the colorful light information display 41-1 to the acoustooptic controller 5-1; transmitting an instruction of switching on the colorful light information display 41-6 to the acoustooptic controller 5-6; transmitting an instruction of switching on the acoustic information display 42 to the acoustooptic controller 5-7; controlling the screen display 43 to describe in graphics and text that the identity of the vehicle engine is illegal, and writing the monitoring operation records into the memory 12 (626);
26. checking the read/write unit 9 (627);
27. if there exists identification information of the read/write unit 9, checking the member anti-fake means 3-4 (628);
28. if there exists identification information of the member anti-fake means 3-4, controlling the screen display 43 to describe in graphics and text that the identity of the rear license plate of the vehicle is legal; transmitting an instruction of switching on the colorful light information display 41-1 to the optical controller 5-1 if the operation records contain the correct information of the other three member anti-fake means 3-1, 3-2 and 3-3 at the same time; writing the monitoring operation records into the memory 12 (629);
29. if there does not exist identification information of the member anti-fake means 3-4, transmitting an instruction of switching off the colorful light information display 41-1 to the acoustooptic controller 5-1; transmitting an instruction of switching on the colorful light information display 41-6 to the acoustooptic controller 5-6; transmitting an instruction of switching on the acoustic information display 42 to the acoustooptic controller 5-7; controlling the screen display 43 to describe in graphics and text that the identity of the rear license plate of the vehicle is illegal, and writing the monitoring operation records into the memory 12 (630);
30. if there does not exist information of the read/write unit 9, transmitting an instruction of switching off the colorful light information display 41-1 to the acoustooptic controller 5-1; transmitting an instruction of switching on the colorful light information display 41-6 to the acoustooptic controller 5-6; transmitting an instruction of switching on the acoustic information display 42 to the acoustooptic controller 5-7; controlling the screen display 43 to describe in graphics and text that the identity of the rear license plate of the vehicle is illegal, and writing the monitoring operation records into the memory 12 (632);
31. checking the member anti-fake means 3-1 (633);
32. if there exists identification information of the member anti-fake means 3-1, controlling the screen display 43 to describe in graphics and text that the identity of the front license plate of the vehicle is legal; transmitting an instruction of switching on the colorful light information display 41-1 to the optical controller 5-1 if the operation records contain the correct information of the other three member anti-fake means 3-4, 3-2 and 3-3 at the same time; writing the monitoring operation records into the memory 12 and member anti-fake means 3-1 (635);
33. if there does not exist identification information of the member anti-fake means 3-1, transmitting an instruction of switching off the colorful light information display 41-1 to the acoustooptic controller 5-1, and transmitting an instruction of switching on the colorful light information display 41-6 to the acoustooptic controller 5-6; transmitting an instruction of switching on the acoustic information display 42 to the acoustooptic controller 5-7; controlling the screen display 43 to describe in graphics and text that the identity of the front license plate of the vehicle is illegal; and writing the monitoring operation records into the memory 12 (637);
34. checking the member anti-fake means 3-2 (638);
35. if there exists identification information of the member anti-fake means 3-2, controlling the screen display 43 to describe in graphics and text that the identity of the car frame is legal; transmitting an instruction of switching on the colorful light information display 41-1 to the optical controller 5-1 if the operation records contain the correct information of the other three member anti-fake means 3-4, 3-1 and 3-3 at the same time; writing the monitoring operation records into the memory 12 and member anti-fake means 3-2 (640);

36. if there does not exist identification information of the member anti-fake means 3-2, transmitting an instruction of switching off the colorful light information display 41-1 to the acoustooptic controller 5-1, and transmitting an instruction of switching on the colorful light information display 41-6 to the acoustooptic controller 5-6; transmitting an instruction of switching on the acoustic information display 42 to the acoustooptic controller 5-7; controlling the screen display 43 to describe in graphics and text that the identity of the car frame is illegal, and writing the monitoring operation records into the memory 12 (642);

37. checking the acoustooptic controller 5-1 (643);

38. if there exists identification information of the acoustooptic controller 5-1, writing the monitoring operation records into the memory 12 (645);

39. if there does not exist identification information of the acoustooptic controller 5-1, transmitting an instruction of switching on the colorful light information display 41-6 to the acoustooptic controller 5-6; transmitting an instruction of switching on the acoustic information display 42 to the acoustooptic controller 5-7; controlling the screen display 43 to describe in graphics and text that the colorful light information display 41-1 is illegal; and writing the monitoring operation records into the memory 12 (647);

40. checking the acoustooptic controller 5-2 (648);

41. if there exists identification information of the acoustooptic controller 5-2, writing the monitoring operation records into the memory 12 (650);

42. if there does not exist identification information of the acoustooptic controller 5-2, transmitting an instruction of switching on the colorful light information display 41-6 to the acoustooptic controller 5-6; transmitting an instruction of switching on the acoustic information display 42 to the acoustooptic controller 5-7; controlling the screen display 43 to describe in graphics and text that the colorful light information display 41-2 is illegal; and writing the monitoring operation records into the memory 12 (652);

43. checking the acoustooptic controller 5-3 (653);

44. if there exists identification information of the acoustooptic controller 5-3, writing the monitoring operation records into the memory 12 (655);

45. if there does not exist identification information of the acoustooptic controller 5-3, transmitting an instruction of switching on the colorful light information display 41-6 to the acoustooptic controller 5-6; transmitting an instruction of switching on the acoustic information display 42 to the acoustooptic controller 5-7; controlling the screen display 43 to describe in graphics and text that the colorful light information display 41-3 is illegal; and writing the monitoring operation records into the memory 12 (657);

46. checking the acoustooptic controller 5-4 (658);

47. if there exists identification information of the acoustooptic controller 5-4, writing the monitoring operation records into the memory 12 (660);

48. if there does not exist identification information of the acoustooptic controller 5-4, transmitting an instruction of switching on the colorful light information display 41-6 to the acoustooptic controller 5-6; transmitting an instruction of switching on the acoustic information display 42 to the acoustooptic controller 5-7; controlling the screen display 43 to describe in graphics and text that the colorful light information display 41-4 is illegal; and writing the monitoring operation records into the memory 12 (662);

49. checking the acoustooptic controller 5-5 (663);

50. if there exists identification information of the acoustooptic controller 5-5, writing the monitoring operation records into the memory 12 (665);

51. if there does not exist identification information of the acoustooptic controller 5-5, transmitting an instruction of switching on the colorful light information display 41-6 to the acoustooptic controller 5-6; transmitting an instruction of switching on the acoustic information display 42 to the acoustooptic controller 5-7; controlling the screen display 43 to describe in graphics and text that the colorful light information display 41-5 is illegal; and writing the monitoring operation records into the memory 12 (667);

52. checking the acoustooptic controller 5-6 (668);

53. if there exists identification information of the acoustooptic controller 5-6, writing the monitoring operation records into the memory 12 (670);

54. if there does not exist identification information of the acoustooptic controller 5-6, transmitting instructions of switching off the colorful light information display 41-1, 41-2, 41-3, 41-4 to the acoustooptic controllers 5-1, 5-2, 5-3, 5-4; transmitting an instruction of switching on the acoustic information display 42 to the acoustooptic controller 5-7; controlling the screen display 43 to describe in graphics and text that the colorful light information display 41-6 is illegal; and writing the monitoring operation records into the memory 12 (672);

55. checking the acoustooptic controller 5-7 (673);

56. if there exists identification information of the acoustooptic controller 5-7, writing the monitoring operation records into the memory 12 (675);

57. if there does not exist identification information of the acoustooptic controller 5-7, transmitting an instruction of switching on the colorful light information display 41-6 to the acoustooptic controller 5-6; controlling the screen display 43 to describe in graphics and text that the acoustic information display 42 is illegal; and writing the monitoring operation records into the memory 12 (677);

58. checking the communication interface 13-9 to determine whether there exists a legal instruction signal from the computer of the management center (678);

59. if there exists a legal instruction signal from the computer of the management center, the microcomputer accepting the control of the computer of the management center and making operation records (679);

after the communication between the computer of the management center and the microcomputer 1 has finished, microcomputer 1 restarting a work cycle;

if there exists no legal instruction signal of the computer of the management center, microcomputer 1 entering the next cycle.

What is claimed is:

1. A motor vehicle identity anti-fake apparatus, characterized in that the apparatus comprises member anti-fake means (3), a microcomputer (1), information displays (4) and communicators (2);

the microcomputer (1) comprising a microprocessor (11), a memory (12) and a group of communication interfaces (13), which microcomputer is mounted on the vehicle or license plate thereof;

each of the member anti-fake means (3) being a means containing identify identification information, the license plate and respective members of the vehicle legally enrolled and registered according to stipulations of the administrative institution being respectively provided with at least a member anti-fake means (3); respective member anti-fake means being in signal connection with respective communication interface (13) of the microcomputer (1), respectively; there being two types of member anti-fake means, wherein one type is the member anti-fake means (3-1) that is in wired signal connection with the microcomputer, and the other type is the member anti-fake means (3-3) that is in wireless signal connection with the microcomputer; the microcomputer monitoring status of the identify information of respective member anti-fake means, so as to make judgment on the status of the identity of the license plate or members of the vehicle on which the respective member anti-fake means mounted;

the informal displays (4) being mounted on the license plate or members of the vehicle, and being connected to the communication interfaces (13) of the microcomputer (1) by wires; the information displays employing colorful light information display (41), acoustic information display (42) or screen display (43), and the function of these information displays being to convert the signal transmitted from the microcomputer (1) and reflecting the legality of the status of the vehicle identity to information expressing modes, including at least one of colorful light, acoustic information or graphics and text, that can be identified directly by sense of human being;

the communicators (2) being wireless bidirectional communication apparatus and mounted on the vehicle or the license plate, and the number of the communicators being at least one; the communication interfaces of the communicators being connected to the communication interfaces (13) of the microcomputer (1) by wires; and the communicators being used for intercommunication between the motor vehicle identity anti-fake apparatus and the outside administrative institution;

whereby a vehicle-mount information system for monitoring and reflecting the legality of the status of the vehicle identity is formed by means of the signal connections among the microcomputer (1), the respective member anti-fake means (3), the information displays (4) and the communicators (2).

2. The motor vehicle identity anti-fake apparatus according to claim 1, characterized in that each of the member anti-fake means (3-1) being in wired signal connection with the microcomputer is a IC chip means, comprising a data input/output interface (302), a memory (301) for storing identity identification information, wherein the data input/output interface (302) is connected to the communication interfaces (13) of the microcomputer (1) by wires.

3. The motor vehicle identity anti-fake apparatus according to claim 1, characterized in that each of the member anti-fake means (3-3) being in wireless signal connection with the microcomputer is a noncontact IC card chip, and is in signal connection with said microcomputer through a noncontact IC card read/write unit, wherein said noncontact IC card read/write unit is mounted on the vehicle or the license plate and is in signal connection with said concontact IC card chip in a radio frequency communication manner; and wherein, the communication interface of said noncontact IC card read/write unit is connected to said communication interface (13) of said microcomputer (1) by wires.

4. The motor vehicle identity anti-fake apparatus according to claim 1, characterized in that each of the member anti-fake means (3) are fixed on the license plate or respective members of the vehicle in a sticking or covering seal manner.

5. The motor vehicle identity anti-fake apparatus according to claim 1, characterized in that each of said colorful light information displays (41) is an electrical light-emitting means, and there are at least three colorful light information displays (41) with at least two different colors, wherein the input ports of respective colorful light displays (41) are connected to the communication interfaces (13) of the microcomputer (1) by wires, respectively.

6. The motor vehicle identity anti-fake apparatus according to claim 5, characterized in that the electrical light-emitting means is a light-emitting diode.

7. The motor vehicle identity anti-fake apparatus according to claim 1, characterized in that said acoustic information display (42) is a electrical sounding means, and there is at least one acoustic information display, wherein the input port of the acoustic information display (42) is connected to the communication interface (13-8) of the microcomputer by wires.

8. The motor vehicle identity anti-fake apparatus according to claim 1, characterized in that said screen information display (43) is an electronic screen information display means having a communication interface, and there is at least one screen information display, wherein the screen information display is mounted in the cab of the vehicle and the communication interface of the screen display is connected to the communication interface (13-7) of the microcomputer via wires.

9. The motor vehicle identity anti-fake apparatus according to claim 5 or 7, characterized in that said colorful light information displays (41) and acoustic information display (42) are connected to the microcomputers, respectively, via an acoustooptic controller (5), wherein each of the acoustooptic controller (5) is a microcomputer system having an acoustooptic drive module (502), comprising CPU, ROM, RAM, I/O, a communication interface (501), an acoustooptic drive module (502) and an output port (503); and the communication interface of each of the acoustooptic controller (5) being connected to the communication interface (13) of the microcomputer via wires, respectively; the output port (503) of respective acoustooptic controller being directly connected to the input port of respective colorful light information displays (41) or the acoustic information display (42), wherein the connection ports and the respective acoustooptic controller are packaged into an integral closed body by insulating material.

10. The motor vehicle identity anti-fake apparatus according to claims 1, 5, or 7, characterized in that said member anti-fake means (3), colorful information displays (41), acoustic information display (42), microcomputer (1) and communicators (2) are mounted and packaged into the body (7) of the license plate, wherein the body of the license plate serves as the base and casing of these components, and the body of the license plate is made from insulating material, with the front face of the license plate body being provided with windows through which the colorful light information displays (41) radiate color light signal to outside.

11. The motor vehicle identity anti-fake apparatus according to claim 1, characterized in that said microcomputer (1), information displays (4) and communicator (2) are packaged into a cartridge which is mounted inside the cab of the vehicle.

12. A motor vehicle identity anti-fake method by using the motor vehicle identity anti-fake apparatus according to claim 1, characterized in that the motor vehicle identity anti-fake apparatus automatically detects the status of the vehicle identity, displays or communicates in a wireless manner the detection results according to pre-configurations of the administrative institution or to the real-time wireless remote control instructions issued by the administrative institution, wherein the administrative institution loads in advance in the microcomputer (1) operation management software, and writes into the microcomputer the archive information of the vehicle and identify identification information of respective member anti-fake means (3) and the position on which the respective member anti-fake means are located; after completing the above said configurations, the motor vehicle identity anti-fake apparatus starts to operate automatically under the control of the microcomputer; and wherein according to the predetermined program, the microcomputer makes detection and judgment automatically with respect to the following five aspects based on the detection demand, time information, current image feature information of the vehicle, the identity feature information of the illegal vehicles which are required to be particularly looked up, issued by the administrative institution in wireless manner and received by the communicators (2):

(1) judging the legality of the license plate or members of the vehicle, wherein the microcomputer (1) extracts information from respective member anti-fake means (3) and compares the extracted information with the feature information of the respective member anti-fake means previously stored in the microcomputer (1); if all the features are consistent with each other, it indicates that the identity of the license plate and members are legal; if the feature information of one or more of the member anti-fake means is inconsistent or does not exist, it means that the identity of the vehicle is illegal;

(2) judging whether the motor vehicle has passed the verification and check with respect to stipulated items on schedule, wherein the microcomputer (1) retrieves contents of the items which have passed the verification and check and the period of validity from vehicle archive information stored in advance in the memory (12) of the microcomputer, and makes judgment to determine whether or not said items are still within said period of validity; if all the items fall within the period of validity, it means that the vehicle has passed the verification and check with respect to the stipulated items on schedule; otherwise, it means that the identity of the vehicle is illegal;

(3) judging whether the motor vehicle has special usages or not, wherein the microcomputer (1) retrieves and judges information on usage of the vehicle and period of validity of the usage from the vehicle archive information stored in advance in the memory (12) of the microcomputer; if there exists some special usages which should be registered in the administrative institution and such special usages fall within the period of validity, it means that the vehicle has such special usages; otherwise, it means that the vehicle has no such special usages;

(4) judging to determine whether the vehicle belongs to an illegal vehicle particularly tracked by related enforcement organ, wherein the communicator (2) receives the identity feature information issued in wireless manner by the administrative institution about the illegal vehicle that needs to be particularly tracked, and immediately stores such information into the microcomputer (1); the microcomputer (1) compares the received feature with the feature of the present vehicle as stored in advance; if the features are consistent with each other, it means that the present vehicle belongs to the illegal vehicle particularly tracked by the related enforcement organ;

(5) judging whether the appearance and color are in conformity with those of in the enrollment and registration, wherein the communicator (2) receives the feature information about the real-time image of the present vehicle transmitted by the external detection station, and immediately stores the received feature information into the microcomputer (1); the microcomputer compares the received information with the image feature of the present vehicle in the vehicle archive information stored in advance; if the comparison result is consistent, it means that the vehicle is legal in terms of the appearance and the color; otherwise, it means that the vehicle identity is illegal;

and wherein the microcomputer (1) stores at any moment the detection and judgment conclusions in terms of the above five aspects into the memory (12), and at the same time controls the display modes and contents of the information displays according to the property of the detection and judgment conclusions, as well as controls the transmission timing and contents of the communicators (2) according to the instructions as issued by the administrative institution in a wireless communication manner.

13. The motor vehicle identity anti-fake method according to claim 12, characterized in that said step of controlling the transmission timing and contents of the communicators by the microcomputer according to the instructions as issued by the administrative institution in a wireless communication manner further comprising the following steps:

the receiver of the communicator (2) being always in operation status under the management of the microcomputer, upon the microcomputer (1) finds that the communicators (2) receive the calling information of the management center or the detection station, the microcomputer storing the set of information into the memory (12), and making judgment from this set of information to determine whether there exists a detection demand of the administrative institution for checking and detecting the present vehicle; and if there exists such a detection demand, the microcomputer (1) furthers determining the authority of the detecting party; if the detection demand is legal, according to a predetermined program, the microprocessor (11) of the microcomputer (1) selecting information within the authority of the detecting party from the information stored in the memory (12), and organizing and generating reply information and controlling the transmitter of the communicators (2) to transmit the reply information.

* * * * *